Aug. 20, 1940.   O. SIEBLER ET AL   2,212,458
SPRINGING ARRANGEMENT
Original Filed Aug. 25, 1936
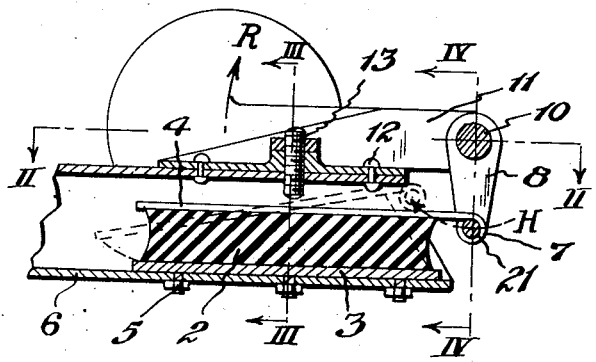
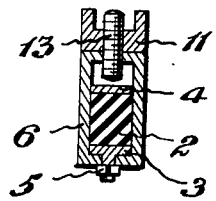
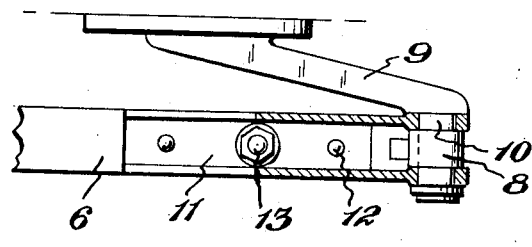
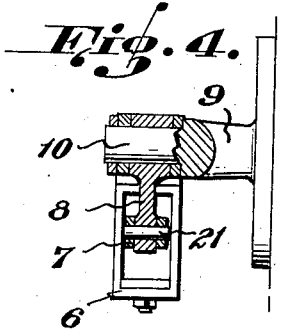
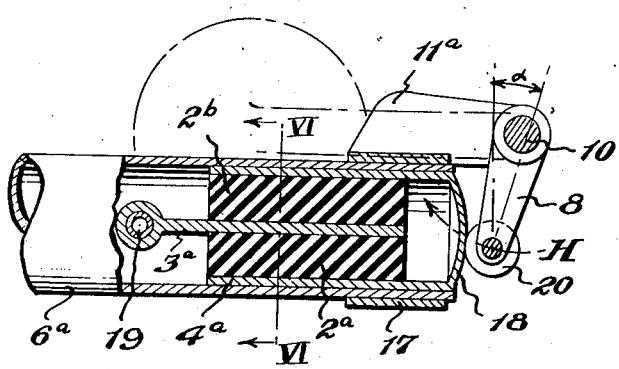
INVENTORS,
O. Siebler and W. Boxan
BY
Glascock Downing & Seebold
ATTORNEYS.

Patented Aug. 20, 1940

2,212,458

UNITED STATES PATENT OFFICE 2,212,458

SPRINGING ARRANGEMENT

Oscar Siebler, Zwickau, and Walter Boxan, Zschopau, Germany

Original application August 25, 1936, Serial No. 97,856. Divided and this application March 23, 1938, Serial No. 197,737. In Germany August 28, 1935

6 Claims. (Cl. 267—21)

The invention relates to a springing arrangement, more particularly for automobiles with swinging link members carrying the wheels and using rubber members stressed in shear. The present application is a division of our co-pending application Serial No. 97,856, filed August 25, 1936.

Such rubber members have hitherto been made in the form of sleeves extending in the direction of the link member journals and distorted by a rotary movement. In these constructions the material is not uniformly utilized, because the inner and outer shear surfaces are of different sizes. The transmission ratio between the power and the load is predetermined and fixed by the length of the link member. The link member journal passing through the rubber sleeve must be of considerable length and must have two bearings, which involves considerable expense. Also such rubber sleeves are difficult to manufacture and fix.

In contradistinction thereto the novelty of the invention consists in this, that the rubber members are constructed in the form of prisms extending in the mean direction of movement of the link member. The rubber members in this case are deformed by a movement which takes place in the axis of the prisms. The material can, in this case, be uniformly utilized because all the shear surfaces are equal. Fundamentally, any ratio of transmission between the power and the load is possible, so that very hard rubber materials can be used. Such rubber members are simply made and easily fixed. The constructional expense for mounting them is only small, on account of the prismatic shape. According to the invention the rubber members are provided with adhering plates, which are releasably connected at one side with the frame and at the other side with the link member. In this way it is made possible easily to insert and remove the rubber members without damage.

Rubber members of prismatic form are already known, for example for engines and gears of automobiles. In these constructions however, the rubber members serve only for providing a vibrationless mounting or for damping the oscillations. They must, as a rule, be so greatly stressed that their springing properties remain small.

Several constructional examples of the invention are illustrated in the accompanying drawing.

Fig. 1 is a vertical principal section through the first spring arrangement.

Figs. 2–4 are corresponding sections along the lines II—II, III—III and IV—IV in Fig. 1.

Fig. 5 is a vertical principal section through another spring arrangement.

Fig. 6 is a sectional view taken on the line VI—VI of Fig. 5.

In the constructional example according to Figs. 1–4 the rubber body 2 is made prismatic and is connected with two plates 3, 4, so as to adhere firmly. The lower plate 3 is secured by means of screw bolts 5 to the lower web of the box-like longitudinal frame member 6. The upper plate 4 is constructed as a spring plate and is pivoted by means of a spring eye 7 to the short arm 8 of the wheel link member 9. The link member 9 is guided by means of a journal 10 in a bracket 11 secured by means of rivets 12 to the upper web of the longitudinal frame member 6. In the bracket 11 is mounted an adjustable screw bolt 13, which strikes against the plate 4 in such a manner that this tilts inwardly when the link member arm 8 swings. The rubber member 2 is enclosed in the rear end of the frame member 6.

If the wheel swings upwardly in the direction R, the plate 4 is moved forwardly by the arm 8 in the direction H. Since the spring eye 7 also moves upwardly relative to the frame member 6, the plate 4 is simultaneously turned about the screw bolt 13. In addition to the shear stress in the direction H of the movement of the arm 8, there are also tension and compression stresses in the vertical direction. This causes the springing to be harder the greater is the wheel deflection, so that a progressive springing characteristic is obtained. The amount of progressiveness can be varied within any desired limits by adjusting the point 13 and in this way the running requirements can be met. Also the natural damping of the springing arrangement can be influenced by giving the rubber member 2 a certain initial tension in the direction perpendicular to the direction H.

In the constructional example according to Figs. 5 and 6 the plate 4 of Fig. 1 consists of a bearing sleeve guided in a frame tube 6a which encloses the rubber members 2. The plate 3a is held by means of a transverse bolt 19 mounted in a frame tube 6a. The link member arm 8 is provided with a roller 20 which engages with the rolling track 18 formed on the end of the bearing sleeve 4a at an angle α. A bracket 11a in the modification of Figs. 5 and 6 is secured to the end of the frame tube 6a by means of a clip 17. If the arm 8 swings in the direction H its effective lever arm is shortened to such an extent that a progressive swinging action is obtained. The rubber members 2a and 2b are thereby protected from all additional stresses.

The prismatic rubber members can also have other shapes, which are determined by the construction of the longitudinal frame member and of the link member The essential feature of the invention is that the longitudinal axis of the prismatic rubber member approximately coincides with the direction of movement of the engaging arm of the link member. The length of the engaging link member arm is immaterial for the invention.

We claim:

1. A springing arrangement for a wheel of a vehicle including a tubular shaped frame, a bracket mounted on the frame, a wheel carrying link member journaled in said bracket, an arm fixed to said link member, a tubular shaped sleeve mounted for longitudinal movement in said frame, a rubber member attached to the inner surface of said sleeve, means fixed to the frame and engaging another surface of said rubber member, and an arcuate shaped end portion carried by said sleeve adjacent the free end of said arm, whereby the free end of said arm engages the arcuate shaped end portion of the sleeve so that the springing of the wheel carrying link member is opposed by the shear resistance of the rubber member.

2. A springing arrangement for a wheel of a vehicle including a tubular shaped frame, a bracket mounted on the frame, a wheel carrying link member journaled in said bracket, an arm fixed to said link member, a tubular shaped sleeve mounted for longitudinal movement in said frame, a rubber member attached to the inner surface of said sleeve, a plate fixed to said frame extending along the inner surface of said rubber member and attached thereto, and an arcuate shaped end portion carried by said sleeve adjacent the free end of said arm, whereby said arm engages the arcuate shaped end portion of the sleeve and the springing of the wheel carrying link member is opposed by the shear resistance of the rubber member between the sleeve and said plate.

3. A springing arrangement for the wheel of a vehicle including a tubular shaped frame, a bracket mounted on the frame, a wheel carrying link member journaled in said bracket, an arm fixed to said link member, a tubular shaped sleeve mounted for longitudinal movement within said frame, two rubber members each attached to the inner surface of said sleeve, a plate fixed to said frame and attached to each of the rubber members, and an arcuate shaped arm-engaging track carried on the end of said sleeve, whereby the springing of the wheel carrying link member is opposed by the shear resistance of each rubber member.

4. A springing arrangement for a wheel of a vehicle including a frame, a bracket mounted on the frame, a wheel carrying link member journaled in said bracket, an arm member rigidly fixed to said link member and a roller carried by the free end thereof, a sleeve member movably mounted within said frame, a rubber member attached to the inner surface of said sleeve, a plate fixed to said frame extending along another surface of said rubber member and attached thereto, and an arcuate shaped end portion carried by said sleeve adjacent said roller whereby the roller carrying end of said arm engages said arcuate shaped end portion of the sleeve and the springing of the wheel carrying link member is opposed by the shear resistance of the rubber member.

5. A springing arrangement for a wheel of a vehicle including a tubular shaped frame, a bracket mounted adjacent one end of the frame, a wheel-carrying link member journaled in said bracket, an arm fixed to said link member, a tubular shaped sleeve enclosed by said frame and mounted for longitudinal guided movement within the frame, two rubber members each attached to the inner surface of said tubular sleeve, a plate fixed to said frame and having each opposite surface attached to one of the rubber members, and an arcuate shaped end portion carried by the sleeve adapted to be engaged by the free end of said arm, whereby the sleeve is moved by said arm during the springing of the wheel and the movement of the sleeve is opposed by the shear resistance of the rubber members between the plate and the sleeve.

6. A springing arrangement for a wheel of a vehicle including a hollow frame member, a bracket mounted on the outside of the frame member, a wheel carrying link member journalled in said bracket and having an arm terminating adjacent the open end of the frame member, a sleeve movably mounted inside said frame member, a rubber member attached to the inner surface of said sleeve, means fixed to the frame member engaging another surface of said rubber member, and means extending across the end of said sleeve adjacent the free end of said arm whereby the springing of the wheel carrying link member causes the free end of the arm to engage said last mentioned means so that the springing of the wheel is opposed by the shear resistance of the rubber member.

OSCAR SIEBLER.
WALTER BOXAN.